Fig. 1

TERNARY DIAGRAM @ 80° F.

Fig. 2

Sept. 12, 1961 C. A. DUVAL, JR 2,999,803
CAUSTIC ECONOMY AND AVOIDANCE OF POLLUTION
Filed June 15, 1959 7 Sheets-Sheet 3

TERNARY DIAGRAM @ 80°F.

Fig.3

INVENTOR
CLAIBORNE A. DUVAL, JR
BY Francis J. Johnston
AGENT

Fig. 4

Sept. 12, 1961     C. A. DUVAL, JR     2,999,803
CAUSTIC ECONOMY AND AVOIDANCE OF POLLUTION
Filed June 15, 1959     7 Sheets-Sheet 5

TERNARY DIAGRAM @ 130°F.

Fig. 5

INVENTOR
CLAIBORNE A. DUVAL, JR.
BY *Francis Johnston*
AGENT

United States Patent Office 2,999,803
Patented Sept. 12, 1961

2,999,803
CAUSTIC ECONOMY AND AVOIDANCE
OF POLLUTION
Claiborne A. Duval, Jr., Beaumont, Tex., assignor, by mesne assignments, to Socony Mobil Oil Company, Inc., New York, N.Y., a corporation of New York
Filed June 15, 1959, Ser. No. 820,551
13 Claims. (Cl. 208—39)

The present invention relates to the removal of sulfhydryls and phenols from hydrocarbon mixtures with aqueous solutions with which the alkali metal salts of the extracted sulfhydryls and/or phenols form mixtures which at temperatures within the range of about 60° F. and about 150° F. form two substantially immiscible phases and, more particularly, to the separation of sulfhydryls and/or phenols from the salt phase with a hydrocarbon solvent whereby the sulfhydryls and/or phenols are separated from the alkali metal with substantially no loss of alkali metal and whereby pollution of the surrounding air, or water courses with sulfhydryls and/or phenols is avoided.

In the U.S. Patent No. 2,850,434 issued September 2, 1958, in the names of F. W. Brooks, Jr. and C. A. Duval, Jr., there is disclosed a "Process for Purifying Petroleum With Multi-Phase Treating Solutions of Alkyl Phenols and Alkali and Process for Regenerating Said Solutions." The patentees disclose that in contrast to the prior art methods for extracting sulfhydryls in the patented process the extracting medium is a liquid containing free alkali metal hydroxide, an alkali metal salt or salts of one or more solutizers and water which liquid is substantially immiscible with aqueous solutions of alkali metal hydroxide. The patentees more fully describe their novel extracting media by specific reference to extracting media containing alkyl phenols and particularly alkyl phenols boiling within the range of about 200° F. to about 650° F. The novel alkyl phenol extracting media are described by reference to FIGURES 1, 2, 3 and 4 of the aforesaid U.S. Patent No. 2,850,434. (FIGURE 1 of the present application corresponds to FIGURE 4 of the aforesaid U.S. patent.)

Figure 1:
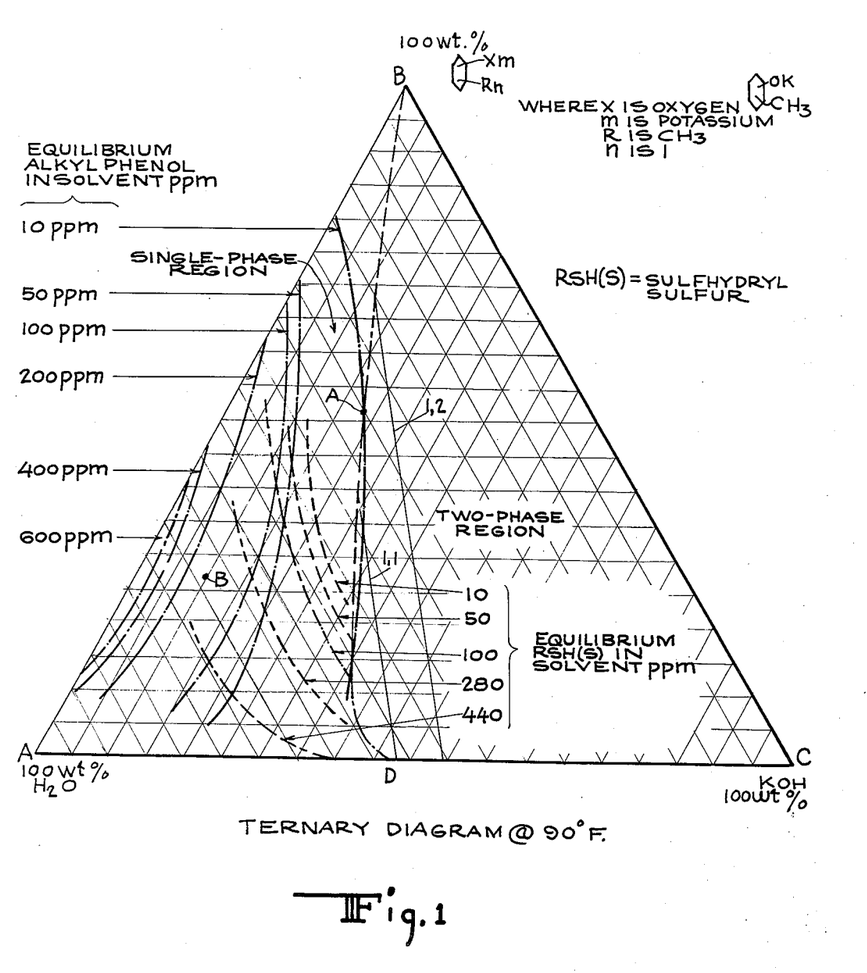
FIGURE 1 is a ternary diagram for the system: potassium hydroxide, potassium alkyl phenolates (cresylates), water at 90° F. with superposed curves showing the equilibrium concentration in parts per million (p.p.m.) of alkyl phenols from petroleum oil having a boiling range within the range of about 200° to about 650° F. in a hydrocarbon solvent (gasoline) and the equilibrium concentration p.p.m. of sulfhydryls in the hydrocarbon solvent (gasoline) for dilute solutions of potassium hydroxide, potassium cresylate, and water having concentrations of less than about 45 percent by weight of potassium hydroxide.
Figure 2:
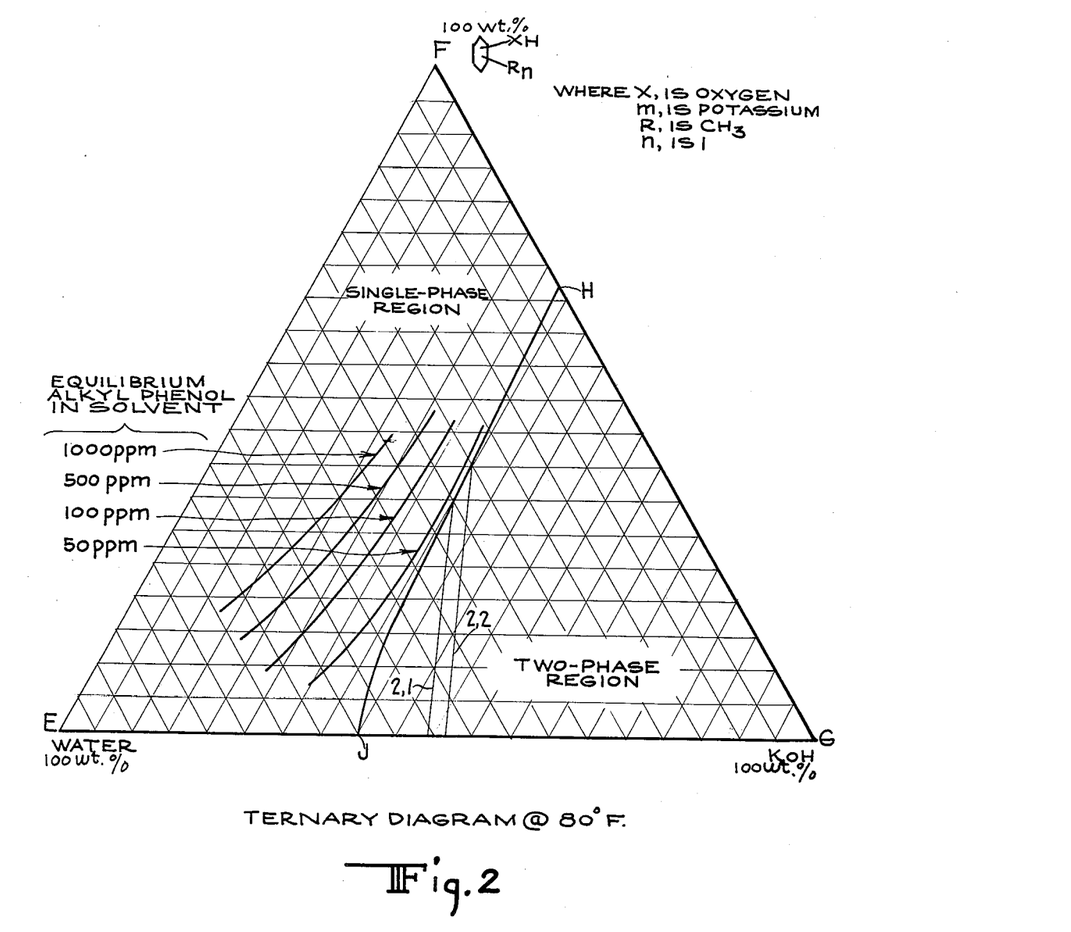
FIGURE 2 is a ternary diagram for the system: potassium hydroxide, alkyl phenols, and water at 80° F.
Figure 3:
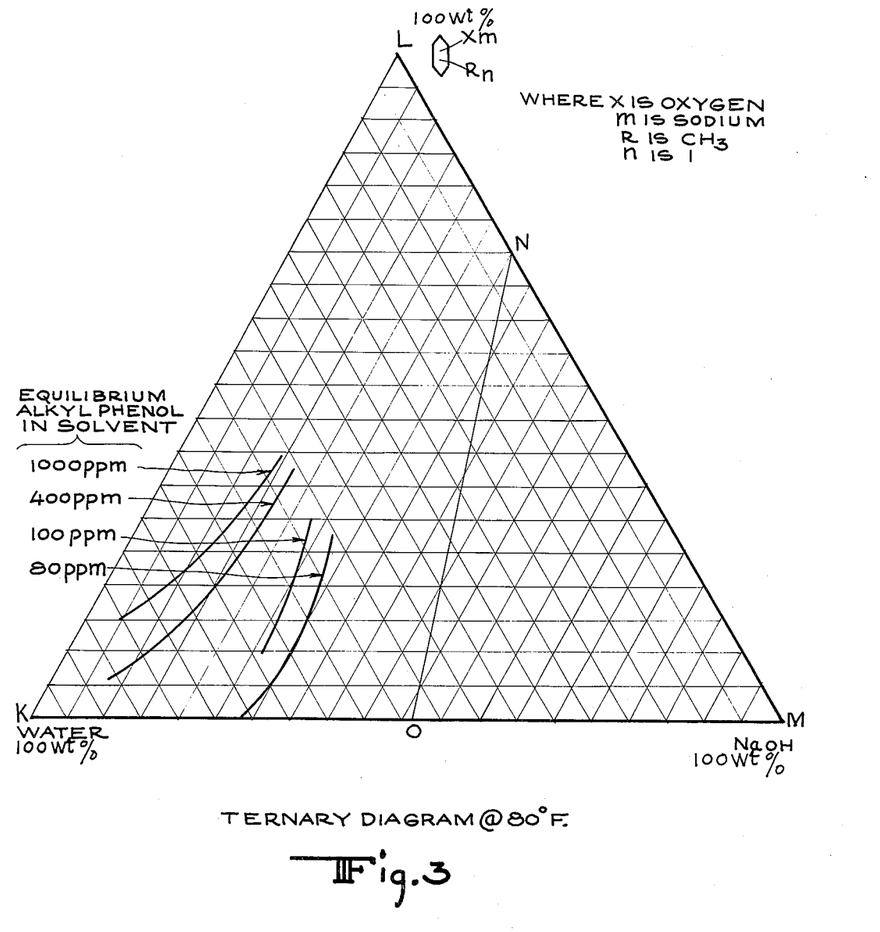
FIGURE 3 is a ternary diagram for the system: sodium hydroxide, sodium cresylate, and water at 80° F. having superposed thereon curves for the equilibrium concentration of alkyl phenol in the hydrocarbon solvent (gasoline) for aqueous solutions having various concentrations of sodium hydroxide less than about 50 percent by weight.
Figure 4:
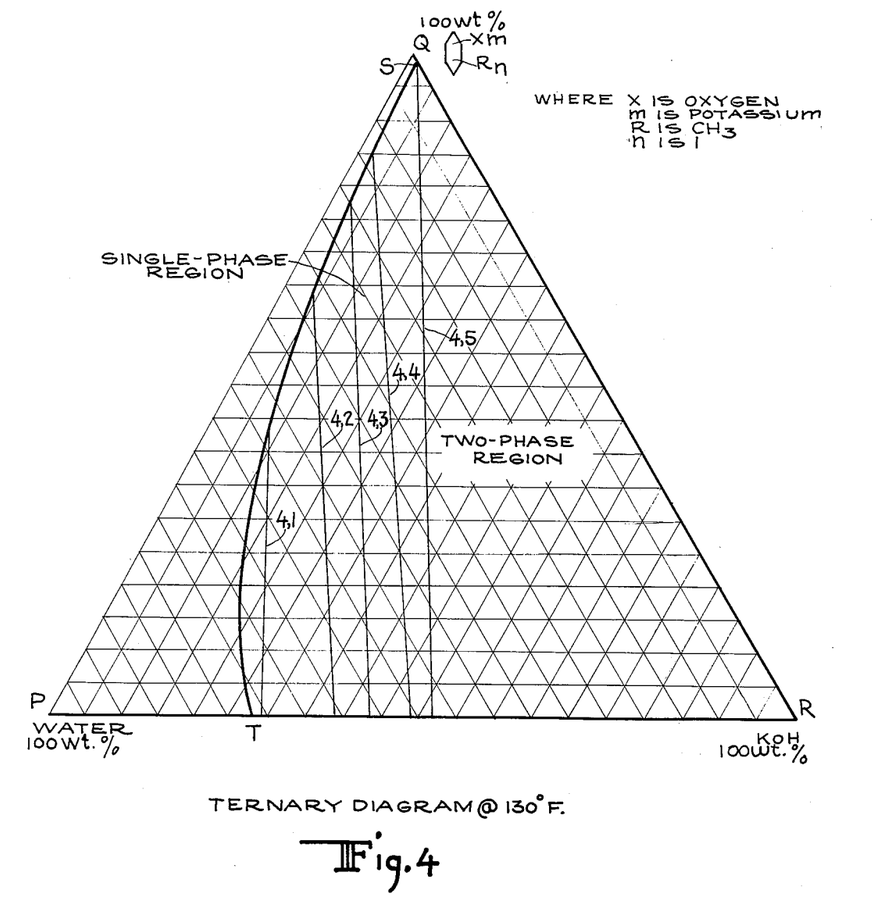
FIGURE 4 is a ternary diagram for the system: potassium hydroxide, potassium cresylates, and water at 130° F.
Figure 5:
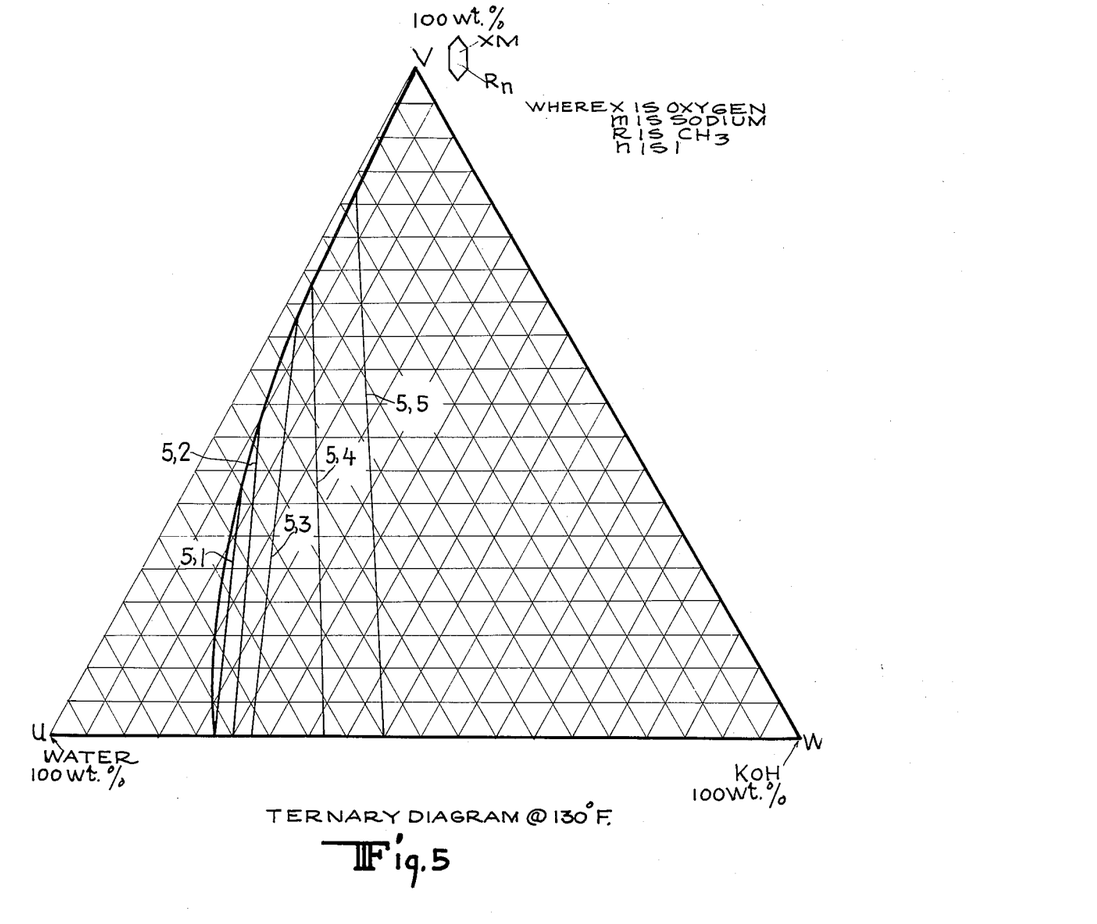
FIGURE 5 is a ternary diagram for the system: sodium hydroxide, sodium cresylate, and water at 130° F.
Figure 6:
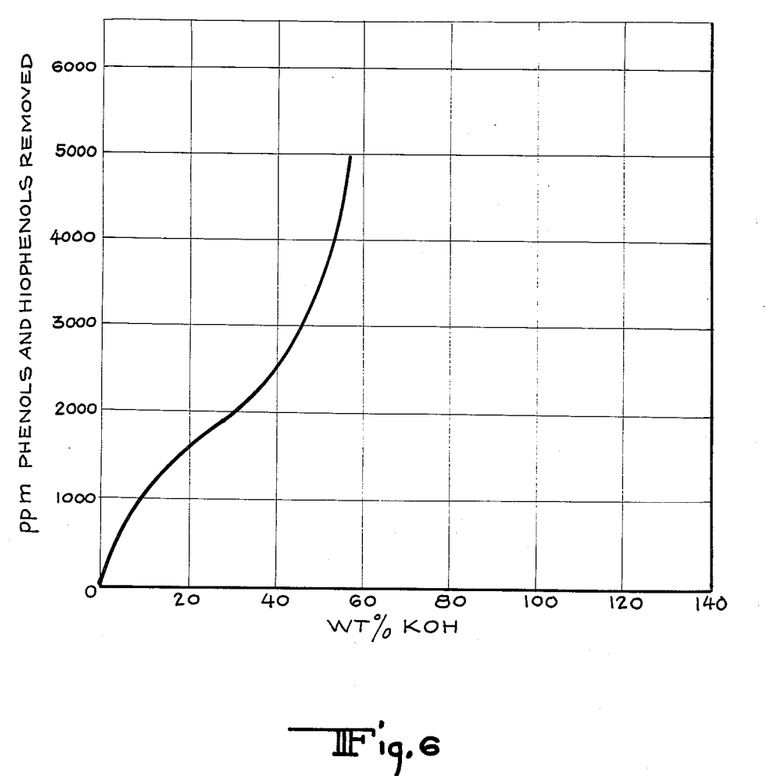
FIGURE 6 is a graph showing the concentration of phenols and thiophenols in aqueous potassium hydroxide solutions of various concentrations.

FIGURE 1 of the present application is a ternary diagram of the system of three components, to wit: water, potassium cresylate, and potassium hydroxide at 90° F. with superimposed curves showing the equilibrium values for sulfhydryls and alkyl phenols in the single phase region of the system. Apex A of the triangle represents 100 weight percent water, zero weight percent potassium hydroxide and potassium cresylate; apex C represents 100 weight percent potassium hydroxide, zero weight percent water and potassium cresylate; and apex B represents 100 weight percent of the aforesaid salts of potassium designated "potassium cresylate," zero weight percent water and potassium hydroxide. The sides of the triangle represent percentage composition by weight of various mixtures of two components. Thus, side A—B represents mixtures of the components, water and potassium cresylate, between 100 weight percent water, zero weight percent potassium cresylate, and 100 weight percent potassium cresylate, zero weight percent water. Side A—C represents mixtures of the components water and potassium hydroxide, between 100 weight percent water, zero weight percent potassium hydroxide and 100 weight percent potassium hydroxide, zero weight percent water. Side B—C represents mixtures of the components potassium hydroxide-potassium cresylate, between 100 weight percent potassium hydroxide, zero weight percent potassium cresylate and 100 weight percent potassium cresylate, zero weight percent potassium hydroxide. Thus, any point within the triangle represents a mixture of the three components in certain concentrations expressed as weight percent.

It has been found that the system water-potassium hydroxide-potassium cresylate when in equilibrium at 90° F. forms a homogeneous one-phase system when the composition of the system is that represented by any point within the triangle to the left of line B—D, i.e., the phase boundary line and that the system is a heterogeneous two-phase system when the composition thereof is represented by any point within the triangle to the right of the aforesaid line CDB, i.e., the phase boundary line.

The present invention is concerned with the recovery of alkali metal hydroxide from the solutizer salt phase of the mixtures in the two-phase region of the system.

The present invention is concerned with the recovery of mercaptans from the mercaptide-containing cresylate phase by means such that the pollution of the surrounding air and public water-courses is avoided.

In FIGURE 1 there is superposed upon the basic ternary diagram a family of curves indicating the equilibrium alkyl phenol (cresol) content of an organic solvent (gasoline) in contact with diluted cresylate phase having various concentrations of water, potassium hydroxide, and potassium cresylate. Other curves indicate the mercaptan sulfur equilibrium concentration in the mercaptan solvent (gasoline) in contact with diluted cresylate phase solutions of various concentrations of water, potassium hydroxide, and potassium cresylate. These equilibrium values for mercaptan sulfur and alkyl phenols change with temperature being greater or lesser as the extraction temperature is higher or lower than 90° F. respectively.

In U.S. Patent No. 2,868,722 issued January 13, 1959, in the names of F. W. Brooks, Jr., and C. A. Duval, Jr., there is disclosed a method of treating cracked distillate fuel oil to produce a stabilized cracked distillate fuel oil having an A.S.T.M. color not darker than 4 after storage in a glass bottle at 100° F. for two months. The patented method comprises contacting a cracked distillate fuel oil with only one reagent consisting of an aqueous solution containing as its sole essential solute at least about 35 percent by weight of alkali metal hydroxide, to obtain a liquid mixture of treated oil, alkali metal salts of extracted acidic organic material, and said reagent. The aforesaid liquid mixture is stratified to obtain an uppermost layer comprising treated distillate fuel oil, an intermediate liquid layer comprising the alkali metal salts of the extracted acidic organic material, and a bottom liquid layer comprising the reagent. Each of the three layers is removed separately. The bottom layer is returned to the extracting stage while the intermediate liquid layer comprising the alkali metal salts of the extracted acidic organic material is treated to dispose of it.

The alkali metal of the salts present in the liquid intermediate layer is lost as alkali metal salt of the springing acid when the acidic organic material is treated with sulfuric acid or flue gas. The alkali metal salt of the springing acid is a drug on the market and must be discarded in some manner avoiding pollution of the local water courses.

Illustrative of the economic loss resulting from the foregoing method of producing stabilized cracked distillate fuel oil is the following: In a treating unit having a throughput of 10,000 barrels per day of cracked distillate fuel oil having a density of seven pounds per gallon and containing 2,000 parts per million (p.p.m.) of acidic organic material 2,800 pounds of sodium hydroxide per day are discarded to waste. The sodium hydroxide costs $60 per ton. Thus, there is a direct recurring cost of $25,000 per year. When the problem of pollution and the cost of avoiding pollution of local water courses is added to the direct cost of the alkali metal hydroxide, the advantages resulting from recovering the alkali metal as alkali metal hydroxide from the intermediate liquid layer comprising alkali metal salts of the extracted acidic organic material are readily recognized.

Similarly, the phenols and other monohydric phenols recovered from coal tar can be extracted with alkali metal hydroxide solution containing at least 35 percent by weight alkali metal hydroxide and the alkali metal hydroxide recovered for re-use.

In contrast, it is present practice to distill coal tar to yield a fraction boiling below about 455° F. containing substantially all of the simpler monohydric phenols, usually entirely phenol, methyl phenols (cresols), and dimethyl phenols (xylenols). The fraction is contacted with dilute aqueous caustic soda (about 15 to about 20 percent by weight) to extract the phenols and the mixture stratified. The salt layer comprising sodium salts of the phenols together with entrained oil and organic bases is then purified by steam stripping or evaporation whereby the entrained oils and nitrogen bases are removed. After purification the salt solution is treated with carbon dioxide to spring the phenols and the phenols separated by decantation from the aqueous solution of sodium carbonate. The aqueous carbonate solution is treated with lime to convert the sodium carbonate to sodium hydroxide for use again.

In the present method the phenols are extracted from the fraction boiling below about 455° F. with an aqueous alkali metal hydroxide solution containing at least 35 percent by weight alkali metal hydroxide. The mixture is stratified and the alkali metal salts of the extracted phenols separated from the aqueous alkali and the neutral oils. The alkali metal salt layer is diluted, steamed or evaporated to remove entrained oil and nitrogen bases and extracted with an organic solvent having an initial boiling point at least 25° F. higher than the end boiling point or an end boiling point at least 25° F. lower than the initial boiling point of the extracted phenols. The solvent solution of the phenols is then fractionated to recover the phenols either as overhead or as bottoms and the solvent returned to the solvent extraction stage. The dilute aqueous alkali metal hydroxide solution is concentrated to at least 35 percent by weight alkali metal hydroxide.

From the foregoing discussion it will be apparent to those skilled in the art that the present invention provides a method of recovering alkali metal hydroxide from concentrated aqueous solutions thereof containing alkali metal salts of organic compounds having hydrogen atoms attached directly to an oxygen or a sulfur atom selected from the group consisting of phenol, alkyl substituted monohydric phenols, and sulfhydryls including aliphatic and aromatic mercaptans.

Accordingly, it is an object of the present invention to recover alkali metal hydroxide from liquid aqueous alkali metal hydroxide solutions of alkali metal salts of acidic organic material in which the amounts of alkali metal hydroxide, of alkali metal salts of phenols and of water are proportioned to provide an aqueous alkaline alkali metal salt solution substantially immiscible with aqueous solutions of alkali metal hydroxide at a temperature within the range of about 60° F. and about 150° F. It is another object of the present invention to provide a method for recovering alkali metal hydroxide from liquid aqueous alkali metal hydroxide solutions containing amounts of water, alkali metal hydroxide, and alkali metal salts of acidic organic material which make said alkali metal hydroxide solutions containing said alkali metal salts substantially immiscible with aqueous alkali metal hydroxide solutions containing at least 20 percent by weight alkali metal hydroxide at a temperature within the range of about 60° F. and about 150° F. It is a further object of the present invention to recover alkali metal hydroxide from the alkali metal salt portion of an aqueous alkali metal hydroxide solution which is substantially immiscible with aqueous alkali metal hydroxide solution at a temperature within the range of about 60° F. to about 150° F., said alkali metal salt portion of said aqueous alkali metal hydroxide solution containing at least one of phenol and alkyl phenol, or at least one of phenol, alkyl phenol, and at least one of thiophenol and non-aromatic sulfhydryls including paraffinic and cycloparaffinic sulfhydryls. It is likewise an object of the present invention to provide a method recovering alkali metal hydroxide from liquid aqueous alkali metal hydroxide solutions the alkali metal hydroxide salt fraction of which comprises phenol, methyl phenols, and dimethyl-phenols obtained from coal tar which alkali metal hydroxide salt fraction is substantially immiscible with aqueous alkali metal hydroxide solution at a temperature within the range of about 60° F. to about 150° F. It is also within the purview of the present invention to provide a method for extracting phenols from coal tar fractions with an aqueous alkali metal hydroxide solution in which the alkali metal phenolates are liquid and substantially immiscible and recovering alkali metal hydroxide and phenols. These and other objects and advantages will become apparent to those skilled in the art from the following description taken in conjunction with the drawings in which:

Figure 7:
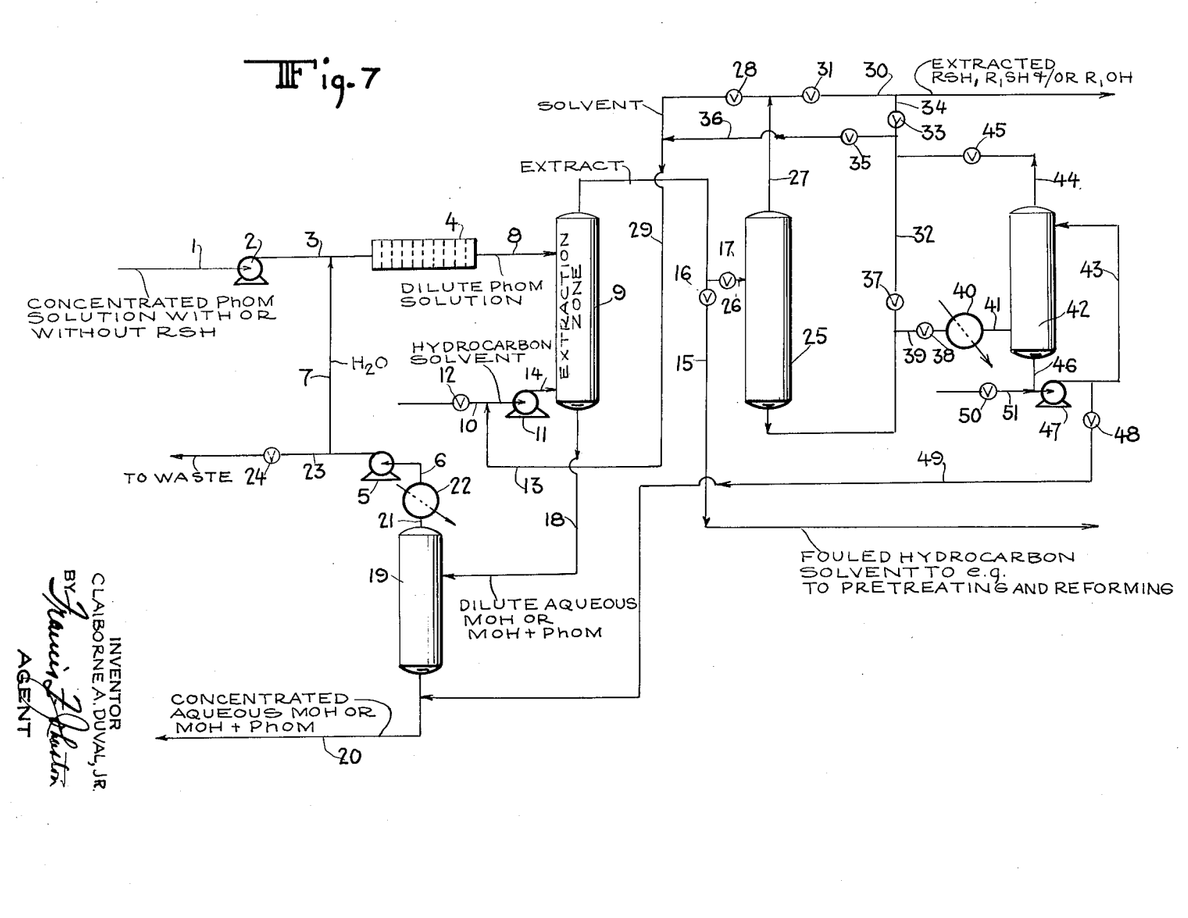
FIGURE 7 is a flowsheet illustrating the recovery of alkali metal hydroxide from a phenolate solution containing mercaptides or from a phenolate solution obtained in treating a petroleum fraction boiling in the kerosine or domestic heating oil range or from a phenolate solution containing phenols extracted from a coal tar fraction. That is to say, the flowsheet of FIGURE 7 illustrates the recovery of alkali metal hydroxide from a solution of phenols or phenol and alkyl phenols, or a solution of alkyl phenols and thiophenols, or a solution of alkyl phenols and aliphatic sulfhydryls or in general from an aqueous salt solution containing sufficient monohydric phenols, alkali metal hydroxide, and water to be substantially immiscible with aqueous alkali metal hydroxide solution at a temperature within the range of about 60° F. and about 150° F., said salt solution containing or being substantially free of aliphatic and/or aromatic sulfhydryls.

The present invention is illustrated with respect to recovering alkali metal hydroxide from salt solutions used to extract mercaptans from petroleum fractions or from aqueous alkali metal hydroxide solutions containing acidic organic material in conjunction with FIGURE 7 as described hereinafter.

Thus, referring to FIGURE 1 a sour gasoline is contacted at 90° F. with a treating medium comprising an aqueous potassium hydroxide containing 51 percent by weight of potassium cresylate, 19 percent by weight of potassium hydroxide, and 30 percent by weight of water. (This composition is represented by point A in FIGURE 1.) The fouled treating medium is separated from the treated gasoline. The fouled treating medium is pumped from a source now shown through pipe 1 by pump 2. Pump 2 discharges the fouled concentrated treating medium into pipe 3. The fouled concentrated treating medium flows through pipe 3 to mixer 4 which can be of any suitable type and as illustrated is an orifice mixer. At some point in pipe 3 intermediate to pump 2 and mixer 4 dilution water drawn by pump 5 from pipe 6, as hereinafter described, and discharged into pipe 7 mixes with the fouled concentrated treating medium. The fouled concentrated treating medium is diluted with 0.5 to 5.0 parts of water, preferably about 1 to 2 parts of water in pipe 3. The diluted fouled treating medium flows through pipe 3 to mixer 4 where the diluted fouled treating mixture is thoroughly mixed as by an orifice mixer. The diluted fouled treating medium flows from mixer 4 through pipe 8 to extraction tower 9. A hydrocarbon solvent for mercaptans, for example, sweet gasoline, sweet kerosine, sweet butane, is drawn from a source not shown through pipe 10 (valve 12 open) by pump 11, or in part from the aforesaid source not shown and in part from pipe 13 or wholly from pipe 13 (valve 12 closed) and discharged into pipe 14. The hydrocarbon solvent, gasoline in the present illustration, is introduced into tower 9 through pipe 14 at a rate to provide a solvent to dilute treating medium to ratio in tower 9 of about 0.1 to 5.0 parts, preferably about 2 to about 4 parts, by volume. The extraction of the mercaptans with the gasoline takes place at temperatures and pressures at which the gasoline is liquid, e.g., at 5–20 p.s.i.g. and 80° to 500° F. The maximum extraction temperature being dependent upon the boiling range of the solvent for the acidic organic material, gasoline in the present illustration. The hydrocarbon solvent flows upwardly countercurrent to the downwardly flowing dilute treating medium and extracts the mercaptans therefrom. The amount of alkyl phenols extracted from the dilute treating medium is insignificant as will be recognized by those skilled in the art. For example, when the hereinbefore described fouled concentrated treating medium is diluted with an equal volume of water the fouled dilute treating medium has a composition represented by point B in FIGURE 1. (26.6 percent by weight potassium cresylate, 9.9 percent by weight potassium hydroxide, and 63.5 percent by weight of water) when the fouled dilute treating medium is extracted by three volumes of sweet gasoline the hydrocarbon solvent will extract about 0.045 pound of alkyl phenol per barrel of gasoline per barrel of fouled concentrated treating medium.

The hydrocarbon solvent, gasoline in the instant illustration, together with extracted sulfhydryls or mercaptans flows from tower 9 through pipe 15 (valve 17 closed; valve 16 open) to means for disposing thereof. For example, the gasoline and extracted mercaptans can be mixed with the feed to a reforming unit, contacted under hydrodesulfurizing conditions whereby the sulfur of the sulfhydryls is converted to hydrogen sulfide, which can be converted to sulfur, and the hydrodesulfurized gasoline reformed.

The extracted dilute treating medium flows from extractor 9 through pipe 18 to evaporator 19. In evaporator 19 the substantially sulfhydryl- or mercaptan-free dilute treating medium or agent is evaporated to provide a concentrated treating medium or agent having a composition such that the concentrated treating agent is substantially immiscible with an aqueous solution of the hydroxide of the alkali metal of the alkyl phenolates. In the instant illustration the concentrated treating medium comprises potassium alkyl phenolates, potassium hydroxide, and water in proportions to make the concentrated treating medium substantially immiscible with aqueous potassium hydroxide at a temperature within the range of about 60° F. to about 150° F.

Thus, for example, the dilute treating medium containing 26.6 percent by weight of potassium alkyl phenolates (cresylates) can be concentrated to provide a solution having a composition which at 90° F. is immiscible with aqueous potassium hydroxide and having a composition represented by a point on line CD or to the right thereof in FIGURE 1. That is to say, the substantially mercaptide-free treating medium is concentrated to provide a concentrated treating medium substantially immiscible with aqueous potassium hydroxide. A dilute solution containing 26.6 percent by weight of potassium cresylates and 9.9 percent by weight of potassium hydroxide, and the balance water is concentrated to 51 percent by weight potassium cresylate, 19 percent by weight potassium hydroxide, and 40 percent by weight water to have a concentrated salt solution substantially immiscible with aqueous potassium hydroxide at 90° F. On the other hand, when the concentrated salt solution is to be used at 90° F., the substantially mercaptide-free dilute treating medium is concentrated to provide a treating medium comprising 46.7 percent by weight potassium cresylate, 17.6 percent by weight potassium hydroxide, and 35.7 percent by weight of water.

The concentrated treating medium flows from evaporator 19 through pipe 20 for use directly as a salt phase treating medium to extract sulfhydryls from hydrocarbon fractions, for admixture with substantially immiscible aqueous potassium hydroxide solution for use as a two-phase treating medium to extract sulfhydryls from hydrocarbon fractions, or as a salt phase for regenerating substantially immiscible aqueous potassium hydroxide solution fouled with mercaptides by transfer of the mercaptides from the aqueous potassium hydroxide solution to the salt phase. (All uses being described in U.S. Patent No. 2,850,434.)

When the hydrocarbon solvent has an initial boiling point at least 25° F. higher than the end boiling point of the extracted mercaptans the treatment of the fouled hydrocarbon solvent can be different. Thus, for example, the same salt phase extracting medium comprising 51 percent by weight potassium cresylate, 19 percent by weight potassium hydroxide, and 30 percent water is fouled with mercaptans extracted from a straight run gasoline. The mercaptans extracted have an end boiling point of about 400° F. The fouled concentrated treating medium is diluted with an equal volume of water as described hereinbefore. The fouled diluted treating medium is introduced into tower 9 and a hydrocarbon solvent for the aforesaid mercaptans having an initial boiling point at least 25° F. higher than the end boiling point of the aforesaid extracted mercaptans, for example, having an initial boiling point of at least about 425° F. such as kerosine is pumped by pump 11 through pipe 14 into tower 9 at a rate to provide a solvent to treating medium ratio of 3 to 1 by volume. The hydrocarbon solvent flows upwardly countercurrent to the downwardly flowing fouled dilute treating medium extracting mercaptans therefrom. The substantially mercaptan-free dilute treating medium flows from tower 9 through pipe 18 to evaporator 19 where the substantially mercaptide-free dilute treating medium is evaporated to provide a concentrated salt phase treating medium substantially immiscible with an aqueous solution of the hydroxide of the alkali metal of the salts in the concentrated treating medium at a temperature within the range of about 60° to about 150° F. The evaporated water flows from evaporator 19 through pipe 21 to condenser 22. The condensed water flows from condenser 22 through pipe 6 to the suction side of pump 5. Pump 5 discharges the water into pipe 7. The water flows through pipe 7 to pipe 3 for use in diluting concentrated treating medium from which the alkali metal cresylates are to be recovered as described hereinbefore. In the event that the volume of condensed water is in excess of that required for dilution, the excess is diverted through pipe 23 under control of valve 24 to use in other processes or to waste.

The hydrocarbon solvent together with extracted mercaptans flowing upwardly through extractor 9 leaves extractor 9 through pipe 15. The solvent being of higher boiling point than the mercaptans is recovered as a bottoms product from a fractionator such as a splitter 25. Accordingly, the hydrocarbon solvent and extracted sulfhydryls flows through pipe 15 (valve 16 closed) to pipe 26 (valve 17 open) and thence to splitter 25. In splitter 25 a temperature is maintained at which the highest boiling extracted mercaptan is volatile. With valve 28 in pipe 29 closed the volatilized mercaptans or sulfhydryls flow through pipe 27 to pipe 30 (valve 31 open) and thence to recovery, use, or to the refinery fuel main.

The bottoms, i.e., the hydrocarbon solvent having an initial boiling point at least 25° F. higher than the end boiling point of the extracted mercaptans flows from splitter 25 through pipe 32 to pipe 36 (valve 33 closed; valve 35 open), and thence through pipe 29 to pipe 10 through which it flows to the suction side of pump 11. Pump 11 discharges the recovered solvent into pipe 14 through which the recovered solvent flows to tower 9 as described hereinbefore.

In the event that the solvent for the sulfhydryls is also a solvent for appreciable amounts of alkyl phenols the solvent is treated for the recovery of the dissolved alkyl phenols. Thus, the bottoms of splitter 25 flows through pipe 32 and with valve 37 closed and valve 38 open flows through pipe 39 to cooler 40. In cooler 40 the solvent and alkyl phenols are cooled to a temperature below the boiling point of aqueous alkali metal hydroxide solution with which the liquid alkali metal alkyl phenolates are substantially immiscible, for example the same concentration of alkali metal hydroxide as that of the bottoms of evaporator 19. From cooler 40 the cooled solvent and alkyl phenols flows through pipe 41 to extractor 42.

In extractor 42 the solvent and alkyl phenols flow upwardly countercurrent to downwardly flowing aqueous alkali metal hydroxide of such strength that the extracted alkyl phenols as alkali metal alkyl phenolates are immiscible when the concentration thereof is at least 5 percent by weight. The aqueous alkali metal hydroxide is introduced into tower 42 through pipe 43.

The solvent stripped of dissolved phenolic compounds flows through conduit 44 (valve 45 open) to pipe 32 and thence to pipe 29 (valve 35 open; valve 33 closed) for use in extracting sulfhydryls in tower 9. The alkali metal hydroxide solution and extracted alkyl phenols flows from extractor 42 through pipe 46 to the suction side of pump 47. Pump 47 discharges the alkaline solution of alkali metal alkyl phenolates into pipe 43 through which the solution returns to extractor 42. When the concentration of alkyl phenolates in the solution approaches or is substantially that in the bottoms of evaporator 19 a portion or all of the aqueous alkaline solution of alkyl phenolates flows through pipe 49 (valve 48 open) to pipe 20. From time to time as required fresh aqueous alkali metal hydroxide solution is introduced through pipe 51 (valve 50 open).

Similarly, distillate fuel oil is treated with alkali metal hydroxide to stabilize the distillate fuel oil with respect to color. A method of stabilizing distillate fuel oil is described in U.S. Patent No. 2,770,581 issued April 27, 1953. The patented method comprises contacting a fuel oil having an A.S.T.M. color darker than 3½ with a first aqueous solution containing as the sole essential solute about 20 to about 55 percent by weight sodium hydroxide, separating the partially treated oil from the fouled first aqueous sodium hydroxide solution, contacting the partially treated oil with a second aqueous solution containing as its sole essential solute about 35 to about 55 percent by weight potassium hydroxide, and separating the treated oil from the aqueous potassium hydroxide solution.

Both the first and the second aqueous solutions described in the aforesaid U.S. Patent No. 2,770,581 contain alkyl phenols which are extracted by the first and second aqueous solutions. These alkyl phenols can be recovered and the alkali metal hydroxide solutions reused by the method of the present invention.

Thus, the first aqueous solution, i.e., containing between about 20 and about 55 percent by weight of sodium hydroxide can be extracted at a temperature within the range of about 80° to about 700° F. but below the boiling point of the solvent and the aqueous solution at the existing pressure with a solvent for the phenolic compounds. Solvents boiling at least 25° F. below the initial boiling of the phenolic material to be extracted, for example, propane, pentane, or light gasoline or solvents such as gas oil, cycle stock and the like having initial boiling points at least 25° F. higher than the end boiling point of the phenolic material to be extracted and the solvent and extracted phenolic material separated from the aqueous solution.

Similarly, the second aqueous solution mentioned in U.S. Patent No. 2,770,581 can be extracted with a solvent for phenolic compounds which solvent has an initial boiling point at least 25° F. higher than the end boiling point of the phenolic compounds or an end boiling point at least 25° F. lower than the initial boiling point of the phenolic compounds. Suitable solvents are propane, butane, pentane, light gasoline, gas oil, etc.

In U.S. Patent No. 2,868,722 issued January 13, 1959 a method is described of stabilizing cracked distillate fuel oil by contact with only one reagent solution containing as its sole essential solute at least about 35 weight percent of alkali metal hydroxide. The treated oil is separated from the reagent solution and liquid mixture of alkali metal salts of extracted acidic organic material and the liquid mixture of alkali metal salts of extracted acidic organic material separated from the aqueous reagent. The destiny of the separated liquid mixture of alkali metal salts of extracted acidic organic material is not indicated in the issued patent. However, the extracted acidic organic material can be treated by the method of the present invention to recover the extracted acidic organic material per se and to provide a dilute aqueous solution of alkali metal hydroxide.

The method of the present invention can also be used to recover the organic acidic material, e.g., alkyl phenols from aqueous alkali metal hydroxide solutions which aqueous alkali metal hydroxide solutions have been used to scrub gasoline. Thus, gasoline containing acidic organic material such as phenolic compounds, for example alkyl phenols is intimately mixed with an aqueous solution of alkali metal hydroxide with which the alkali metal salts of the extracted acidic organic material are substantially immiscible. A suitable aqueous alkali metal hydroxide solution is an aqueous solution of potassium hydroxide having a density of about 45° to 55° Baumé. The treated gasoline is separated from the reagent. The reagent stratifies into two phases. The upper or salt phase comprises the potassium salts of the extracted acidic organic material, potassium hydroxide, and water, and the lower layer or phase comprises an aqueous solution of potassium hydroxide. The upper layer or salt phase is separated from the aqueous hydroxide layer. The separated salt phase is diluted with water in the ratio of about 0.5 to 5 volumes of water per volume of salt phase. The diluted salt phase is then contacted with a solvent for the extracted acidic organic material. Suitable solvents are propane, butane, pentane or light gasoline, kerosine, gas oil or any solvent for the acidic organic material having an initial boiling point at least 25° F. higher than the end boiling point of the extracted acidic organic material or having an end boiling point at least 25° F. lower than the initial boiling point of the extracted acidic organic material.

The extracted dilute salt phase is evaporated to provide a concentrated aqueous solution of alkali metal hydroxide, i.e., potassium hydroxide, with which the potassium salts of extracted acidic organic material are substantially immiscible at a temperature within the range of about 60° F. and about 150° F.

The present method can also be used to recover coal tar phenols. Thus, for example, a fraction of coal tar or other by-product coking oil boiling up to about 455° F. is intimately mixed with an aqueous alkali metal hydroxide solution containing at least about 39 percent by weight of sodium hydroxide or at least about 39 percent by weight potassium hydroxide to obtain a mixture of extracted oil, alkali metal salts of extracted phenols, alkali metal hydroxide, and water. The oil is separated from the aqueous portion of the mixture. The aqueous portion of the mixture is stratified to form an upper salt layer and a lower hydroxide layer. The salt layer is separated from the hydroxide layer. The salt layer is diluted with 0.5 to 5 volumes of water and extracted at a temperature within the range of about 80° F. to 700° F. but not higher than the boiling point of the solvent or dilute solution at the extraction pressure with a solvent for the extracted phenols having an initial boiling point at least 25° F. higher than the end boiling point of the extracted phenols or an end boiling point at least 25° F. lower than the initial boiling point of the extracted phenols. The solvent, for example benzine, middle oil, etc. and the extracted phenols are separated from the dilute salt phase and fractionated to recover the solvent separately from the phenols. The dilute salt phase is concentrated for reuse in extracting more phenols.

Thus, any of the aforedescribed salt phases or salt layers comprising alkali metal hydroxide, alkali metal salts of acidic organic material, and water in proportions to make said salt phases or salt layers substantially immiscible with aqueous solutions of the hydroxide of the alkali metal of the aforesaid alkali metal salts of acidic organic material can be treated by the method of the present invention.

For example, a fraction of coal tar or other hydrocarbons containing phenolic compounds boiling below about 455° F. can be extracted with an aqueous solution of alkali metal hydroxide or such concentration that the alkali metal salts of the aforesaid phenolic compounds are substantially immiscible therewith at a temperature within the range of about 60° to about 150° F. For separation of the alkali metal salts of the aforesaid phenolic compounds from the aqueous alkali metal hydroxide solution at 90° F. an alkali metal hydroxide solution containing about 40 to about 50 percent alkali metal hydroxide by weight is presently preferred.

The extracted hydrocarbon mixture is separated from the alkali metal salts of the extracted phenolic compounds and the alkali metal hydroxide solution. The mixture of aqueous alkali metal salts of the extracted phenolic compounds and aqueous alkali metal hydroxide reagent is stratified. The layer comprising alkali metal hydroxide, alkali metal salts of extracted phenolic compounds, and water, i.e., the upper layer, is separated from the reagent layer comprising alkali metal hydroxide and water.

The upper or salt layer flows through pipe 1 (FIGURE 7) to the suction side of pump 2. Pump 2 discharges the salt layer into pipe 3. In pipe 3 the salt layer is mixed with water flowing through pipe 7 in the ratio of about 0.5 to about 5 volumes of water per volume of salt layer to provide a single phase mixture. The diluted salt phase flows through pipe 3 to mixer 4 in which the diluted salt phase is mixed. From mixer 4 the diluted salt phase flows through pipe 8 to tower 9. In tower 9 the dilute salt solution is contacted with a hydrocarbon solvent boiling at least 25° F. below the boiling point of the lowest boiling extracted phenolic compound (phenol, for example, boiling point 358° F.) or a solvent boiling at least 25° F. above the boiling point of the highest boiling extracted phenolic compound (i.e., 455° F.) for example, the hydrocarbon solvent can be benzol having an end boiling point of about 200° F. The solvent is pumped into tower 9 by pump 11 through pipe 14 at the rate to provide about 0.5 to about 5, preferably about 3 volumes of hydrocarbon solvent per volume of diluted salt phase. The solvent flows upwardly countercurrent to the downwardly flowing dilute salt phase and extracts the acidic organic material, in this instance coal tar phenols, from the dilute salt phase or layer.

The extracted dilute salt layer substantially devoid of extracted phenolic compounds and hence having the alkali metal content thereof preponderantly in the form of alkali metal hydroxide flows from tower 9 through pipe 18 to evaporator 19. In evaporator 19 the dilute hydroxide solution is concentrated to provide an aqueous alkali metal hydroxide solution for use as an extracting medium for extracting acidic organic material from hydrocarbon mixtures. The concentrated hydroxide solution contains alkali metal hydroxide in amount that alkali metal salts of organic material to be extracted are substantially immiscible therewith. The water volatilized from the dilute salt layer in evaporator 19 flows through pipe 21 to condenser 22 and thence through pipe 6 to the suction side of pump 5. Pump 5 discharges the condensate into pipe 7 through which the condensate flows to pipe 3 for use as water of dilution.

The concentrated alkali metal hydroxide solution flows from evaporator 19 through pipe 20 to use in extracting acidic organic material from hydrocarbon mixtures.

The solvent and extracted phenolic compounds flows from extractor 9 through pipe 15 to pipe 26 (valve 16 closed; valve 17 open) and thence to splitter 25. In splitter 25 the hydrocarbon solvent, in the present illustration benzol boiling at about 200° F. is taken as overhead through pipe 27. From pipe 27 with valve 31 closed and valve 28 open all of the overhead is recycled to pipe 10 and the suction side of pump 11. On the other hand, a portion or all of the solvent can be diverted through pipe 30 to other uses or storage or sale.

Where a solvent boiling at least 25° F. higher than the end boiling point of the extracted acidic organic material, in this illustration having an initial boiling point of at least about 480° F. is employed to extract phenolic compounds from the illustrative coal tar fraction, the solvent and extracted phenolic compounds flow from tower 9 to splitter 25 as described hereinbefore. The extracted phenolic compounds are taken overhead through pipe 27 and with valve 28 closed and valve 31 open, flow through pipe 30 to further treatment, storage, distribution, etc. The solvent is a bottoms product. The bottoms flows from splitter 25 through pipe 32. With valve 33 closed and valve 35 open the solvent is recycled to the suction side of pump 11.

Thus, a portion of crude coal tar acid, i.e., containing phenolic compounds was treated as described hereinafter. The crude coal tar acid had the following characteristics:

Specific gravity _____________________________ 1.047
Distillation:
    I.B.P. ______________________________ ° F __ 302
    10% ________________________________ ° F __ 367
    50% ________________________________ ° F __ 377
    90% ________________________________ ° F __ 400
    End point ___________________________ ° F __ 448
    Recovery, volume percent _____________ 98

When 29 grams of the aforedescribed crude coal tar acid was mixed with a solution comprising 221 grams of potassium hydroxide and 216 grams of water, i.e., aqueous potassium hydroxide solution containing about 50.6 percent by weight potassium hydroxide, at 130° F. a single phase, homogeneous mixture was produced. However, when the mixture was cooled to 95° F. a two phase mixture resulted. The analyses of each of the two phases is given as follows:

|  | Top Layer or Salt Phase at 95° F. | | Bottom Layer or Hydroxide Phase at 95° F. | |
| --- | --- | --- | --- | --- |
| Gravity, ° Be | 38 | | 48.2 | |
|  | grams | wt. percent | grams | wt. percent |
| KOH | 93 | 46.3 | 128 | 48.3 |
| K₂O | 79 | 39.3 | 137 | 51.7 |
| Tar acid | 29 | 14.4 | 0 | 0 |
| Total weight | 201 | 100.0 | 265 | 100.0 |

It is preferred to recover acidic organic material from hydrocarbon mixtures devoid of emulsifying concentrations of emulsifiers. Thus, for example, in the extraction of phenols from petroleum fractions it is preferred to treat hydrocarbon fractions devoid of naphthenic acids, for example, in concentrations such that the hydrocarbon mixture and the aqueous alkali metal hydroxide solution for an emulsion which does not stratify in 0.5 hours. However, hydrocarbon mixtures containing emulsifying concentrations of impurities in addition to desired extractable acidic organic material can be extracted with aqueous alkali metal hydroxide solutions of alkali metal hydroxide concentration to form a substantially immiscible phase with the alkali metal salts of the acidic organic material in the presence of demulsifying concentrations of demulsifiers such as cationic emulsifiers, for example, salts of long-chain primary, secondary, or tertiary amines, such as, oleylamine acetate, cetylamine acetate, and quaternary salts, such as cetylpyridinium bromide, diethyl, didodecyl ammonium chloride, and the like and tertiary butyl alcohol.

From the foregoing description of the present invention when used to recover sulfhydryls, and phenolic compounds and alkali metal hydroxide from liquid aqueous solutions or salt phases or salt layers containing alkali metal hydroxide, alkali metal salts of sulfhydryls or phenolic compounds, and water in proportions that the liquid aqueous solutions, or liquid salt phases or liquid salt layers are substantially immiscible with aqueous alkali metal hydroxide solutions at a temperature within the range of about 60° F. to about 150° F., those skilled in this art will recognize that the present invention provides a method for recovering acidic organic material from aqueous alkaline solutions of alkali metal salts thereof which comprises diluting the aforesaid aqueous alkaline solution of alkali metal salts of acidic organic material with water, extracting the diluted aqueous alkaline salt solution with a solvent, preferably a hydrocarbon solvent, for the acidic organic material, separating the solvent and extracted acidic organic material from the dilute alkaline solution, separating the solvent from the extracted acidic organic material, preferably by distillation, recovering the extracted acidic organic material, recycling the solvent at least in part to the solvent extraction stage, concentrating the dilute alkaline solution to a concentrated alkaline solution comprising alkali metal hydroxide and water in proportions that alkali metal salts of acidic organic material to be extracted from hydrocarbon mixtures are substantially immiscible with said concentrated alkaline solution, and recycling said concentrated alkaline solution to the aqueous extraction stage.

I claim:

1. A method of recovering acidic organic material and alkali metal hydroxide from an aqueous liquid mixture comprising alkali metal salt of acidic organic material, alkali metal hydroxide, and water in proportions that said aqueous liquid mixture forms two substantially immiscible liquid phases at a temperature within the range of about 60° F. to about 150° F., one of said liquid phases comprising water, alkali metal hydroxide, and alkali metal salt of said acidic organic material, hereinafter designated liquid aqueous salt phase, and the other of said liquid phases comprising water and alkali metal hydroxide hereinafter designated liquid aqueous hydroxide phase, which comprises stratifying said aqueous liquid mixture comprising water, alkali metal hydroxide, and alkali metal salt of acidic organic material to obtain a liquid aqueous salt phase and a liquid aqueous hydroxide phase, separating said liquid aqueous salt phase from said liquid aqueous hydroxide phase, diluting said liquid salt phase with at least 0.5 volume of water to obtain a dilute salt phase, contacting said dilute salt phase in a solvent extraction stage with at least an equal volume of solvent for said acidic organic material, said solvent to be selected from the group consisting of solvents having an initial boiling point at least 25° F. higher than the end boiling point of said acidic organic material, and of solvents having an end boiling point at least 25° F. lower than the initial boiling point of said acidic organic material, to obtain an extract comprising said solvent and acidic organic material and dilute aqueous alkali metal hydroxide solution, separating said extract from said dilute aqueous alkali metal hydroxide solution, fractionating said extract to obtain a solvent fraction and an acidic organic material fraction, recycling said solvent fraction at least in part to said solvent extraction stage, evaporating said dilute aqueous alkali metal hydroxide solution to obtain a concentrated aqueous alkali metal hydroxide solution comprising alkali metal hydroxide and water in proportions that said concentrated aqueous alkali metal hydroxide solution is substantially immiscible with liquid aqueous alkaline solutions of alkali metal salts of said acidic organic material at a temperature within the range of about 60° to about 150° F.

2. A method for recovering alkali metal hydroxide from liquid aqueous mixtures comprising alkali metal salts of acidic organic material comprising at least one of organic sulfhydryls and phenols, said liquid aqueous mixture being substantially immiscible with aqueous solution of alkali metal hydroxide, which comprises mixing liquid aqueous mixture containing alkali metal salt of acidic organic material comprising at least one of organic sulfhydryls and phenols with water to form a dilute aqueous alkaline solution of the aforesaid alkali metal salt of acidic organic material, contacting said dilute aqueous alkaline solution in at least one extraction stage with an organic solvent for said acidic organic material substantially immiscible with aqueous alkaline solution to obtain a solvent phase containing extracted acidic organic material and an aqueous phase containing alkali metal of the aforesaid alkali metal salt as alkali metal hydroxide, separating said solvent phase from said aqueous phase, removing water from said aqueous phase to obtain a concentrated aqueous phase with which liquid alkaline solutions of alkali metal salt of acidic organic material is substantially immiscible, separating said organic solvent from extracted acidic organic material, and recycling said separated solvent to the aforesaid extraction stage.

3. The method set forth and described in claim 2 wherein the acidic organic material is a mixture of sulfhydryl and phenolic compounds, wherein the sulfhydryl is separated from the solvent by distillation, and the phenolic compound is separated from the solvent by extraction with at least 30° Baumé aqueous alkali metal hydroxide.

4. The method set forth and described in claim 2 where the extraction with organic solvent is at a temperature within the range of about 80° to about 700° F.

5. The method set forth and described in claim 2 where the extraction with organic solvent is at a temperature within the range of about 350° to about 450° F.

6. The method set forth and described in claim 2 wherein the acidic organic material is phenolic compound from the carbonization of coal.

7. The method set forth and described in claim 2 wherein the acidic organic material is phenolic compound from petroleum fraction.

8. A method of recovering acidic organic material and alkali metal hydroxide from an aqueous liquid mixture comprising alkali metal hydroxide, alkali metal salt of at least one phenol, and water in proportions that said aqueous liquid mixture forms two substantially immiscible liquid phases at a temperature within the range of about 60° F. and about 150° F., one of said liquid phases comprising water, alkali metal hydroxide, and alkali metal salt of at least one phenol, hereinafter designated liquid salt phase, and the other of said liquid phases comprising water and alkali metal hydroxide, hereinafter designated liquid hydroxide phase, which comprises stratifying the aforesaid aqueous liquid mixture to produce the aforesaid liquid salt phase and the aforesaid liquid hydroxide phase, separating said liquid salt phase from said liquid hydroxide phase, diluting said separated liquid salt phase with at least 0.5 volume of water based upon the volume of said liquid salt phase to obtain a dilute salt phase, contacting said dilute salt phase in a solvent extraction stage with at least an equal volume of water immiscible solvent for said phenol, said water-immiscible solvent for phenol being selected from the group consisting of solvents having an initial boiling point at least 25° F. higher than the end boiling point of said phenol and of solvents having an end boiling point at least 25° F. lower than the initial boiling point of said phenol to obtain a two-phase mixture comprising an extract phase comprising solvent and extracted phenol and an aqueous phase comprising dilute aqueous alkali metal hydroxide, separating said extract phase from said aqueous phase, fractionating said extract phase to obtain a solvent fraction and at least one phenol fraction, recycling said solvent fraction at least in part to the aforesaid solvent extraction stage, and evaporating the aforesaid aqueous phase to obtain a concentrated aqueous alkali metal hydroxide solution comprising water and alkali metal hydroxide in proportions that said concentrated aqueous alkali metal hydroxide solution is substantially immiscible with liquid aqueous alkaline solutions of alkali metal salts of at least one phenol at a temperature within the range of about 60° F. to about 150° F.

9. The method set forth and described in claim 8 wherein the at least one phenol is an alkyl phenol and the solvent for extracting said alkyl phenol from the dilute salt phase is gasoline.

10. The method set forth and described in claim 8 wherein the at least one phenol is a mixture of alkyl phenols having a boiling range up to about 650° F. and the solvent for extracting said alkyl phenols from the dilute salt phase is a petroleum fraction having an initial boiling point of at least 675° F.

11. The method set forth and described in claim 8 wherein the at least one phenol is a mixture of phenols from a fraction of coal tar boiling below about 455° F.

12. A method of recovering phenols from a coal tar fraction containing phenols which comprises in a caustic extraction stage contacting a coal tar fraction containing at least one phenol with aqueous alkali metal hydroxide containing at least 35 percent by weight of alkali metal hydroxide to obtain a liquid aqueous phase substantially immiscible with extracted coal tar fraction, said liquid aqueous phase comprising alkali metal hydroxide, alkali metal salt of at least one extracted coal tar phenol, and water in proportions to form two substantially immiscible liquid phases at a temperature within the range of about 60° F. to about 150° F., separating said liquid aqueous phase from extracted coal tar fraction, stratifying said separated liquid aqueous phase at a temperature within the range of about 60° F. to about 150° F. to obtain a liquid aqueous salt phase comprising alkali metal hydroxide, water, and alkali metal salt of the aforesaid coal tar phenol and a liquid hydroxide phase comprising water and alkali metal hydroxide, separating said liquid aqueous salt phase from liquid hydroxide phase, diluting said liquid aqueous salt phase with water to obtain dilute aqueous salt phase, in a solvent extraction stage contacting said dilute aqueous salt phase with a substantially water-immiscible solvent for extracted coal tar phenols selected from the group consisting of solvents of the aforesaid class having an initial boiling point at least 25° F. higher than the end boiling point of the extracted phenol and solvents of the aforesaid class having an end boiling point at least 25° F. lower than the initial boiling point of the extracted phenol to produce a solvent extract phase comprising one of the aforesaid solvents and extracted phenol and diluted aqueous alkali metal hydroxide solution, concentrating said dilute aqueous alkali metal hydroxide solution, recycling the concentrated aqueous alkali metal hydroxide solution so obtained at least in part to the aforesaid caustic extraction stage, fractionating the aforesaid solvent extract phase to obtain a solvent fraction and at least one phenol fraction, and recycling said solvent fraction to the aforesaid solvent extraction stage.

13. The method of recovering phenols from a coal tar fraction containing phenols as set forth and described in claim 12 wherein the substantially water-immiscible solvent for coal tar phenols is a hydrocarbon mixture.

References Cited in the file of this patent
UNITED STATES PATENTS

| | | |
|---|---|---|
| 2,770,581 | Brooks et al. | Nov. 13, 1956 |
| 2,846,359 | Myers | Aug. 5, 1958 |
| 2,850,434 | Brooks et al. | Sept. 2, 1958 |
| 2,868,722 | Brooks et al. | Jan. 23, 1959 |
| 2,911,360 | Myers | Nov. 3, 1959 |